Aug. 27, 1968 J. E. HICKERSON 3,399,296

CODE CHECKING MECHANISM

Filed Sept. 29, 1964 3 Sheets-Sheet 1

INVENTOR.
JOHN E. HICKERSON

BY D. Kendall Cooper

ATTORNEY.

Aug. 27, 1968 J. E. HICKERSON 3,399,296

CODE CHECKING MECHANISM

Filed Sept. 29, 1964 3 Sheets-Sheet 2

United States Patent Office 3,399,296
Patented Aug. 27, 1968

3,399,296

CODE CHECKING MECHANISM

John E. Hickerson, Lexington, Ky., assignor to International Business Machines Corporation, New York, N.Y., a corporation of New York Filed Sept. 29, 1964, Ser. No. 400,127
10 Claims. (Cl. 235—61.11)

ABSTRACT OF THE DISCLOSURE

An error detector for an encoding device which comprises a number of thin slides which are provided at different points along their length with code openings through which stop pins are inserted to retard the motion of certain slides and allow a limited motion for the remaining slides; the moving slides causing encoding mechanisms to be operated. The error detection means comprises sense pins associated with each of the stop pins, passing through check openings provided in the slides, associated with each of the code openings only when the slides have assumed the correct configuration and sense means indicating whether the sense pins had freely passed through all of the slides.

This invention relates to code checking mechanisms and more particularly to mechanisms for checking the accuracy of character encoding operations.

Coded information is employed in the operation of various modern business machines. For this reason encoding devices are needed in order to translate business information into coded form. Such encoding devices should be simple, efficient, reliable, and accurate.

One type of encoding device comprises a number of thin strips or slides which are movable longitudinally from inactive positions to active positions. These slides are stacked in a superposed relationship and are provided at different points along their lengths with code openings through which stop pins may be inserted. The code openings at each point are aligned so that a released pin may pass through all of the superposed slides. Some of the openings at each point may be only large enough to receive the pin which then operates to hold the slides having such openings against movement. Other openings at each point may be long enough to permit movement of the slides to their active positions after a stop pin has been inserted through them. Each of the stop pins is normally latched in a position free of the slides, and means are provided for releasing each pin so that it may pass through the aligned code openings associated with it.

In their operation, after one of the stop pins is released, the slides are yieldingly urged toward their active positions. Only those slides having an elongated code opening associated with the released pin are permitted to move to their active positions. Slides which do not have an elongated code opening are retained in their inactive positions by the stop pin. Movement of the strips to their active positions may result in the closing of contacts or the operation of mechanisms to print the character associated with the released stop pin, to punch holes representative of that character, or to perform some other useful function. U.S. Patent Nos. 2,978, 086, issued Apr. 4, 1961, and 3,044,690, issued July 17, 1962, to J. E. Hickerson, which are both assigned to the same assignee as the present invention, show encoding devices of the type described.

Such encoding devices may be subject to errors. For example, after a stop pin has been passed through the aligned openings, one or more of the slides having elongated openings may fail to move from the inactive to the active position because of the presence of foreign substances or mechanical defects. This results in the erroneous encoding of the character associated with the stop pin. Such an error, if not detected, might seriously impair the accurate operation of business machines utilizing the coded information.

It is an object of this invention to solve the above problem.

It is an object of this invention to provide an improved checking mechanism for slide operated encoding devices.

Another object of this invention is to provide a mechanism for directly sensing the positions of the code slides in such an encoding device.

Another object is to provide means for preventing an erroneous output from the encoding device in the event of a malfunction of the code slides.

I accomplish these and other objects of my invention by providing a check opening aligned adjacent the active position of each code opening in the code slides, and a sensing means associated with each of the aforementioned stop pins. These elements cooperate to check the operation of the code slides as follows: after a selected stop pin has passed through the aligned code openings associated with it, and after the slides have been urged toward their active positions, the sensing means associated with the selected stop pin is activated. If all of the code slides have properly assumed their active positions, the check openings associated with the activated sensing means will be aligned so that the sensing means will detect a passage through all of the code slides. But, if for some reason one or more of the code slides fails to properly assume its active position, the check openings will not be aligned, the sensing means will not detect a passage through all of the code slides, and an error will be indicated.

An advantage of my invention is in providing a checking mechanism which is simple and inexpensive to produce.

Another advantage of my invention is in providing a checking mechanism which may be readily adapted to existing encoding devices.

Other objects and advantages of my invention will be pointed out in the following description and claims and illustrated in the accompanying drawings, which disclose, by way of example, the principle of the invention and the best mode, which has been contemplated, of applying that principle.

For purposes of illustration, I have chosen to present the detailed description of my invention in the context of a code converter. However, it will be understood by those skilled in the art that my invention is not limited to code converters. For example, my invention might readily be adapted to a keyboard operated encoding device of the type described in U.S. Patent 2,978,086 to J. E. Hickerson. In fact, my invention may be adapted to any data processing machine which includes a character encoding function. It is therefore apparent that the input solenoids and input code slides described below merely illustrate one means for selecting stop pins and sense pins for the operation of the encoding slides which include my error checking feature.

Figure 1:
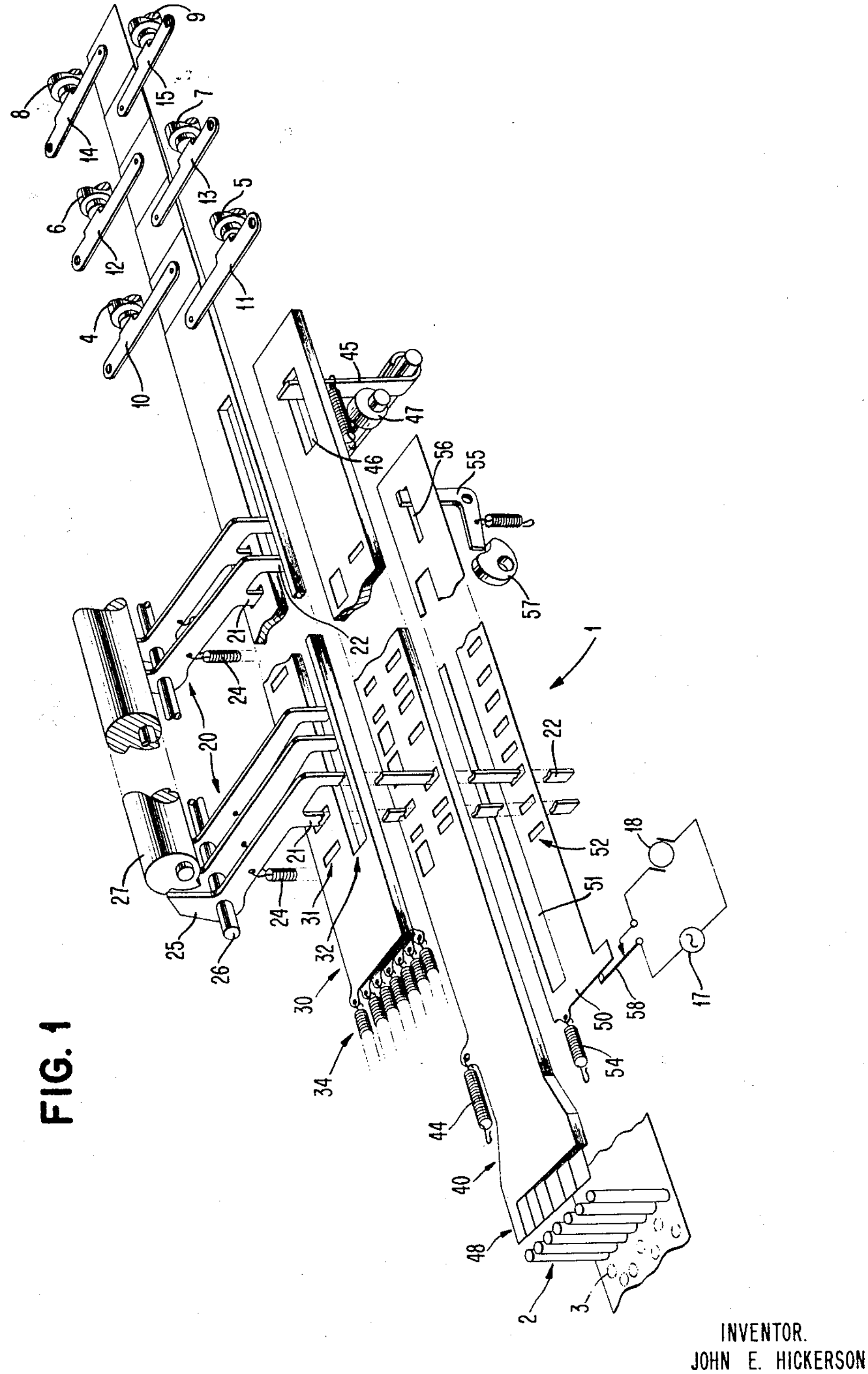
FIG. 1 shows an exploded view of a code converter embodying my invention.

Referring to the drawings, FIG. 1 shows an exploded view of a code converter, generally designated 1, which operates a punch mechanism 2 to punch holes in paper tape 3 in response to electrical impulses applied to solenoids 4–9 shown in fragmentary form. It will be understood that the electrical impulses applied to solenoids 4–9 may be derived from any source of coded information familiar to those skilled in the data processing art. For instance, such electrical impulses might be derived from a punched card or punched paper tape reader, a magnetic tape unit, or the output data channel of a digital computer.

Each of the solenoids 4–9 coacts with a lever arm 10–15 respectively. Each lever arm 10–15 is pivoted about a fixed point at one end and attached at the other end to one of the group of elongated thin metal code slides, collectively designated 30. Each of these input code slides is continuously urged towards its inactive position by bias springs 34, and is adapted to move in a longitudinal direction to its active position in response to the energization of the corresponding solenoid. The input code slides 30, the output code slides, or encoding slides, collectively designated 40, and the error indicating slide 50 are shown in an exploded relationship in order to more clearly illustrate the present invention. These slides are normally stacked in superposed relationship and are supported and retained within a channel member, not shown. Each of the metal code slides is preferably only a few thousandths of an inch thick so that the entire stack has a thickness in the neighborhood of one sixteenth of an inch. Reference is made to U.S. Patents 3,044,690 and 2,978,086 to J. E. Hickerson for a more detailed exposition of the cooperation of the slides and the supporting channel member.

A plurality of pin arms, collectively designated 20, are pivotally supported on a rod 26 which is mounted in parallel relationship to the code slides 30, 40, 50. Each of the pin arms 20 has a stop pin 21 and a sense pin 22 depending therefrom. The stop pins 21 and sense pins 22 are positioned at intervals along the length of the code slides 30. At this point it should be noted that, for the purposes of my invention, the stop pin and the sense pin at each position need not depend from a single pin arm. Separate arms for the stop pin and the sense pin might be utilized to advantage.

The stop pins 21 are adapted to pass through code openings, collectively designated 31. The sense pins 22 are adapted to pass through unobstructed openings 32. The pins 21 and 22 are continuously urged toward the code slides 30 by biasing springs 24. Two step cam 27, driven by schematically indicated motor 18 by means of a linkage not shown, cooperates with the cam follower portions 25 of pin arms 20 to control the movement of pins 21 and 22 toward and away from the code slides in accordance with operating characteristic 62 shown in FIG. 3.

Code slides 30 serve to select the pin arm 20 corresponding to each unique pattern of electrical impulses applied to input solenoids 4–9. For this purpose, the code openings 31 in code slides 30 are arranged so that, when a selected pattern of impulses is applied to solenoids 4–9 causing selected ones of code slides 30 to move to their active positions, the code openings 31 will align themselves so that one and only one of the stop pins 21 is permitted to pass through the slides 30. The remaining stop pins 21 will be blocked from passing through the slides 30 by reason of the fact that the code openings associated with the remaining stop pins are out of alignment. A more detailed description of the actual layout of the code openings in each of the slides of the group 30 can be found in U.S. Patents 3,044,690 and 2,978,086 to J. E. Hickerson.

Figure 2:
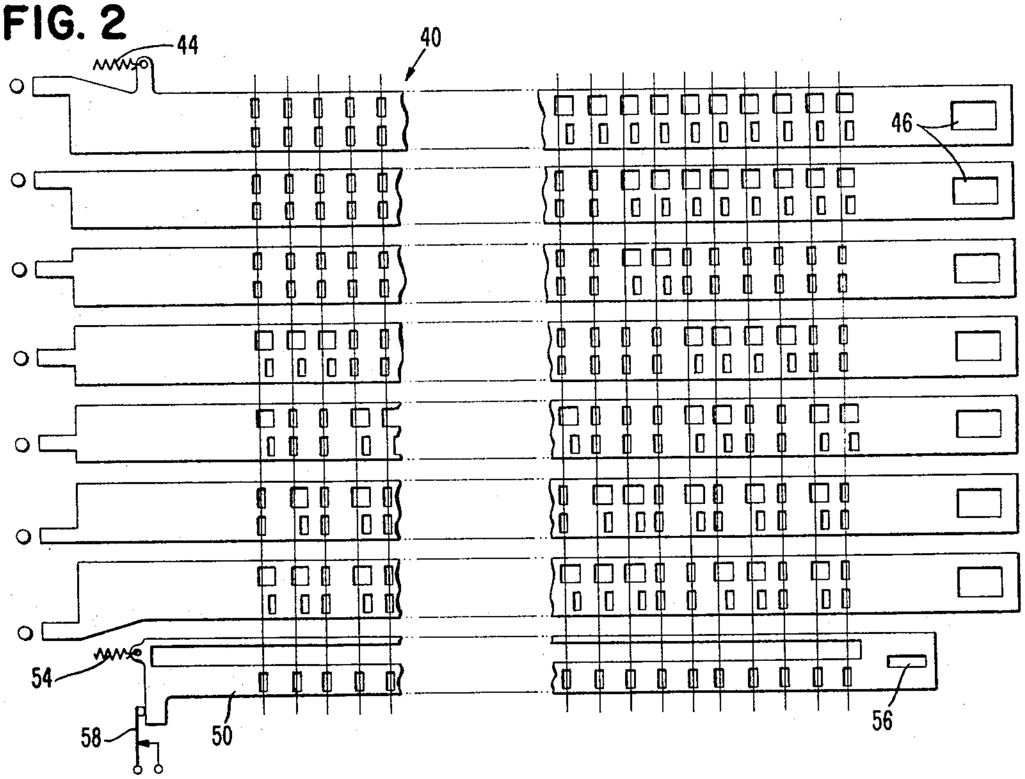
FIG. 2 is a detailed view of the code slides showing the relationship of the code openings and the check openings.

In order to provide a coded output corresponding to the stop pin selected by input slides 30, I provide a group of encoding slides 40. Encoding slides 40 are adapted to assume a unique pattern of positions in response to each stop pin 21 selected by slides 30. This pattern of positions serves to control the punching of output paper tape 3 by means of extensions 48 of slides 40 which act as interposers in output punch mechanism 2. Such an output punch is described in detail in U.S. Patent 3,044,690. The positioning of encoding slides 40 is achieved by means of a pattern of code openings 41 in each of the encoding slides 40. As shown in FIG. 2 some of the code openings 41 are only sufficiently large to receive a stop pin 21 after the stop pin has passed through the openings 31 in slides 30. Others of the openings 41 are elongated so as to permit movement of the slides 40 after a stop pin has been inserted.

Encoding slides 40 are continuously urged toward their active positions by biasing springs 44 shown in FIG. 1. The movement of the encoding slides 40 to and from their active positions is controlled by lever arm 45 which engages slots 46 in slides 40. Lever arm 45 is driven by cam 47 in accordance with operating characteristic 63 shown in FIG. 3.

In order to check the accuracy of operation of encoding slides 40, a set of check openings 42 are provided. As shown in FIG. 2, each of the check openings 42 is aligned adjacent the active position of the corresponding code opening 41. Each of the check openings 42 is just large enough to receive one of the sense pins 22. This means that the check openings at any point will be aligned to pass the corresponding sense pin only if the encoding slides properly move to their active positions after the insertion of the stop pin with which the sense pin is associated.

In order to prevent the operation of output punch mechanism 2 in the event of a malfunction of encoding slides 40, the preferred form of my invention utilizes an error indicating slide 50. FIG. 1 shows error indicating slide 50 having openings 52 adapted to receive sense pins 22 after they have passed through check openings 42 in encoding slides 40. Error indicating slide 50 is continuously urged towards its active position by means of bias spring 54. The movement of error indicating slide 50 is controlled by lever arm 55 which engages slot 56 in slide 50. Lever arm 55 is driven by cam 57 in accordance with operating characteristic 64 shown in FIG. 3.

It is noted that the openings 52 in error indicating slide 50 are only large enough to receive sense pins 22. Hence, if check openings 42 in encoding slides 40 are properly aligned to pass a sense pin, that sense pin will penetrate one of the openings 52 in error indicating slide 50 thus retaining slide 50 against movement.

Figure 4:
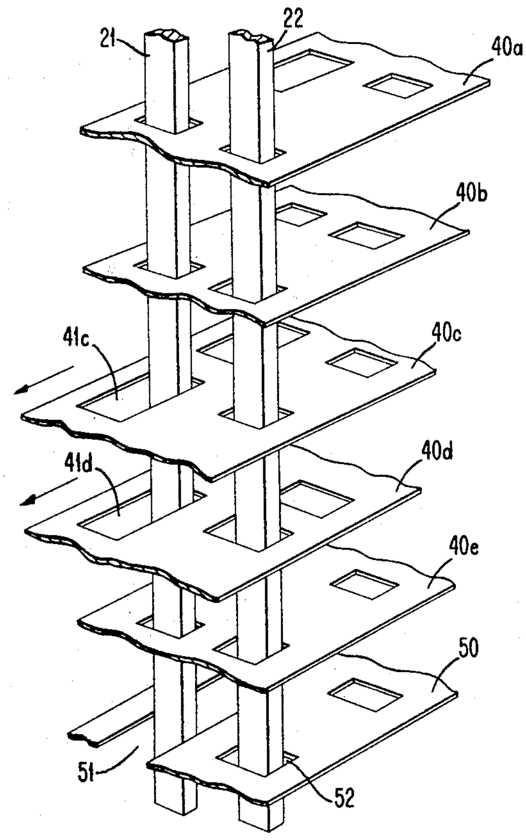
FIG. 4 is an illustration of the proper operation of the code slides.

The proper operation of encoding slides 40 is illustrated in detail in FIG. 4 of the accompanying drawings, in which the various elements are shown in exploded relationship for purposes of clarity. Referring to FIG. 4, it is noted that stop pin 21 has passed through all of the encoding slides 40*a*–40*e* shown in fragmentary form. It is seen that slides 40*c* and 40*d*, which having elongated openings 41*c* and 41*d* associated with the inserted stop pin, have moved to their active positions as indicated by the arrows, while slides 40*a*, 40*b* and 40*e*, which do not have elongated openings have been retained in their inactive positions. Sense pin 22 is shown passing through check openings 42*a*–42*e* which are aligned by reason of the proper movement of the slides 40*c* and 40*d* to their active positions. It is further noted that sense pin 22 passes through opening 52 in error indicating slide 50 thus retaining slide 50 in its inactive position and preventing an error indication.

Figure 5:
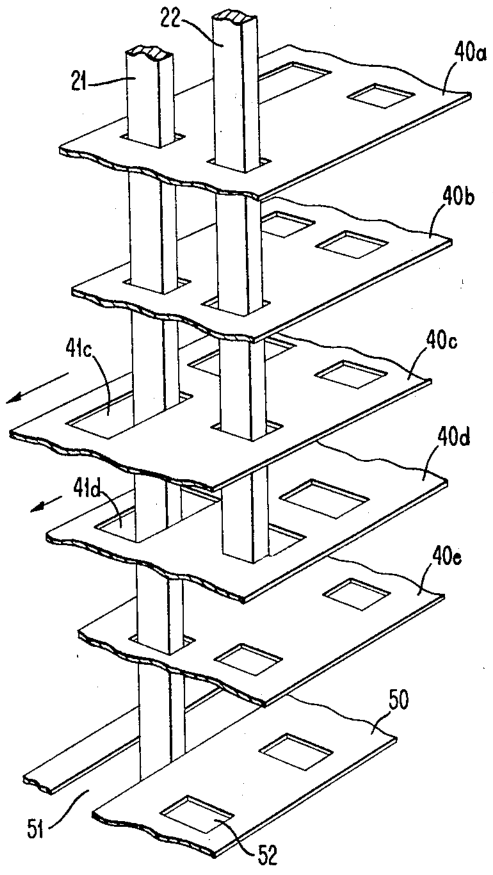
FIG. 5 is an illustration of the error condition wherein one of the code slides has failed to properly move to its active position.

Referring back to FIG. 1, if, on the other hand, due to some malfunction of the encoding strips 40, the openings 42 fail to pass a sense pin, then error indicating slide 50 will be caused to move to its active position by biasing spring 54 when released by lever arm 55 thereby opening contact 58 which breaks the circuit between power source 17 and main drive motor 18 thus interrupting the operation of the punch mechanism 2 and provides an error indication to the operator before the erroneous code is punched in paper tape 3. FIG. 5 of the accompanying drawings illustrates in detail the operation of the code checking mechanism in the event of a malfunction of the encoding slides. The structure depicted is identical to that shown in FIG. 4 except that slide 40*d* has, for some unexplained reason, failed to properly move to its active position. Instead slide 40*d* has moved only part way from its inactive to its active position as shown by the smaller length arrow. Therefore, check opening 42*d* is not aligned to pass sense pin 22, and, consequently, sense pin 22 is prevented from passing through all of the slides 40*a*–40*e* by the interference of slide 40*d* as shown. Since sense pin 22 was not available to penetrate opening 52, error indicating slide 50 is not restrained from moving to its active position, thus indicating an error in the operation of slides 40. Note that error indicating slide 50 is also provided with opening 51 which permits the unobstructed passage of stop pins 21 so that the stop pins do not interfere with the movement of the error indicating slide 50.

It is pointed out that, although my invention is primarily directed to means for checking the accuracy of the character encoding operation, the structure presented in the foregoing description and drawings also provides some measure of error detection with regard to malfunctions of the input code slides 30. More particularly, if the input code slides malfunction in such a way that no stop pin is permitted to pass through them, no sense pin will be available to restrain the error indicating slide from movement, hence the operation of the output punch mechanism will be prevented. On the other hand, slide 50 will not detect malfunctions of the input code slides which result in the wrong stop pin being selected.

At this point it should be noted that, although the preferred form of my invention employs an error indicating slide 50 for the purpose of detecting whether or not a sense pin has passed through the check openings in encoding slides 40, such an error indicating slide is not essential to the practice of my invention. My invention will be served by any means for indicating an error if no sense pin 22 passes through the encoding slides 40. For example, it will be apparent to one skilled in the art that the error indicating function might be performed by a plurality of normally closed electrical switches connected in series. If a sense pin were to pass through the encoding slides, it would open the corresponding switch, thus breaking the circuit and permitting the punching of output tape 3. If, on the other hand, no pin passed through encoding slides, the circuit would remain unbroken and the operation of the punch mechanism would be prevented.

OPERATION

Figure 3:
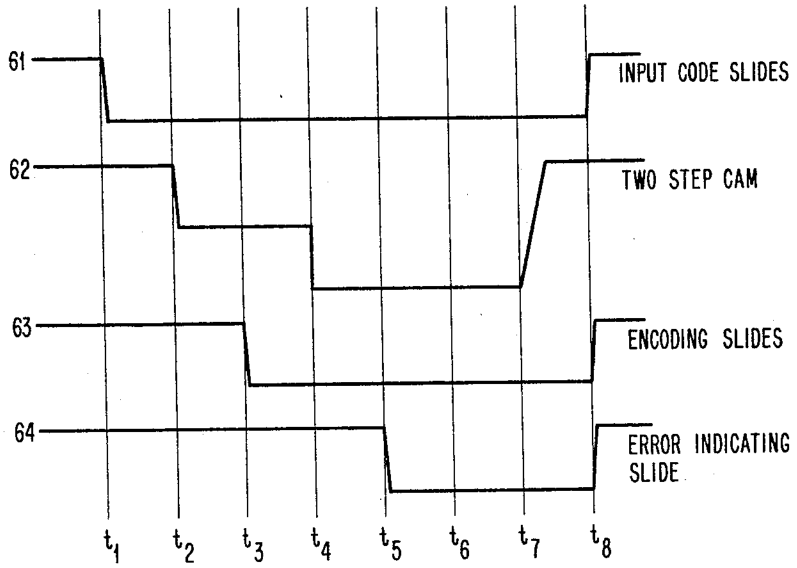
FIG. 3 shows a timing chart indicating the sequence of operation of the elements of the code converter during one cycle of operation.

The sequence of operation of the various elements of the code converter embodying my invention may be best understood by reference to FIG. 1 in conjunction with the timing chart shown in FIG. 3.

Referring to FIG. 3, it is seen that the cycle of operation is initiated at time $t_1$ when input code slides 30 are moved from their inactive to their active positions by solenoids 4–9 according to operating characteristic 61.

At time $t_2$ cam follower portions 25 of pin arms 20 drop into the first dwell of two step cams 27 causing one of the stop pins 21 to penetrate the code openings 31 of input code slides 30 and the code openings 41 of encoding slides 40 in accordance with operating characteristic 62.

At time $t_3$, lever arm 45 is released by cam 47 so that encoding slides 40 are urged to their active positions by bias springs 44 as shown by operating characteristic 63.

At time $t_4$, cam follower 25 of pin arm 20 drops into the second dwell of two step cam 27 allowing the sense pin 22 associated with the selected stop pin to pass through openings 32 in slides 30, and depending whether or not there is an error, through openings 42 in slides 40 and opening 52 in slide 50.

At time $t_5$, lever arm 55 is released by cam 57 so that error indicating slide 50 is urged toward its active position by bias spring 54 in accordance with operating characteristic 64.

After the punch mechanism 2 operates at approximately time $t_6$ to punch the coded information in output paper tape 3, the code converting mechanism is returned to a condition of readiness for the next cycle of operation by the retracting of stop pins 21 and sense pins 22 under control of two-step cam 27 at time $t_7$. Slides 30, 40, and 50 are then returned to their original positions at time $t_8$ b ythe action of bias springs 34 and lever arms 45 and 55 respectively.

It should be understood that the practice of my invention is not limited to a configuration wherein the check openings are located adjacent to their associated code openings. The check openings and code openings may be disposed in any convenient arrangement so long as the functional relationship between them is maintained. In other words, the check openings associated with a particular sense pin must be aligned to receive that sense pin when the slides have properly moved to their active positions subsequent to the insertion of the stop pin associated with that sense pin through the code openings associated with those check openings.

Further, it must be recognized that the practice of my invention need not be limited to an embodiment wherein each slide contains a single row of code openings adjacent to a single row of check openings. For instance, an advantage of compactness could be achieved by placing two or more rows of code openings, with their associated check openings, side by side on each slide.

In addition it will be obvious to one skilled in the art that my invention might be practiced by the use of code slides in the form of concentric cylinders adapted to be moved in an angular direction, and the use of code and sense pins adapted to penetrate the openings in such slides in a radial direction.

While the invention has been particularly shown and described with reference to a particular embodiment thereof, it will be understood by those skilled in the art that the foregoing and other changes in form and details may be made therein without departing from the spirit and scope of the invention.

What I claim is:

1. A checking mechanism for use in a character encoding device having:

a set of superposed slides which are movable from inactive to active positions;

an array of normally retracted stop pins positioned adjacent to said set of slides;

a corresponding array of code openings in each of said slides, said code openings being arranged so that they are aligned to permit the insertion of said stop pins through all of said slides when said slides are in their inactive positions, some of said code openings being elongated so as to permit movement of said slides to their active positions after insertion of said stop pins;

means for selecting the stop pin corresponding to the character to be encoded and for inserting said stop pin through its associated code openings;

actuating means operative after the insertion of said stop pin for yieldably urging said slides toward their active positions, whereby the slides having elongated code openings associated with the inserted stop pin are caused to move to their active positions while the other slides are retained in their inactive positions by said stop pin; and output means responsive to the positions of said slides for producing output manifestations;

said checking mechanism comprising:

an array of normally retracted sense pins releasably biased toward said slides, each of said sense pins being associated with one of said stop pins;

a corresponding array of check openings in each of said slides, said check openings being arranged so that they are aligned to receive a sense pin only if said slides have properly assumed their active positions in response to the actuation of said slides after the insertion of the stop pin associated with said sense pin;

means operative after the actuation of said slides for releasing the sense pin associated with the inserted stop pin; and error indicating means responsive to the failure of the released sense pin to pass through all of the check openings associated therewith for preventing the operation of said output means.

2. A checking mechanism of the type described in claim 1 wherein the error indicating means comprises an additional slide which is movable from an inactive to an active position, said additional slide having an array of openings adapted to receive sense pins which pass through all of the check openings associated therewith:

means operative after a sense pin has been released for yieldably urging said additional slide toward its active position whereby said additional slide is caused to move to its active position if the released sense pin fails to penetrate an opening in said additional slide and said additional slide is retained in its inactive position if a released sense pin penetrates an opening in said additional slide; and means responsive to the movement of said additional slide to its active position for indicating an error.

3. A checking mechanism for use in a character encoding device having:

a set of elongated superposed slides movable longitudinally from inactive to active positions;

a row of normally retracted stop pins positioned adjacent to said set of slides;

a corresponding row of code openings in each of said slides, said code openings being arranged so that they are aligned to permit the insertion of each of said stop pins through all of said slides when said slides are in their inactive positions, some of said code openings being elongated so as to permit movement of said slides to their active positions after insertion of selected ones of said stop pins;

means for selecting the stop pin corresponding to the character to be encoded;

means for inserting the selected stop pin through its associated code openings;

actuating means operative after the insertion of said stop pin for yieldably urging said slides toward their active positions, whereby the slides having elongated code openings associated with the inserted stop pin are caused to move to their active positions while the other slides are retained in their inactive positions by said inserted stop pin; and output means responsive to the positions of said slides for producing output manifestations;

said checking mechanism comprising:

a row of normally retracted sense pins releasably biased toward said slides, each of said sense pins being associated with one of said stop pins;

a corresponding row of check openings in each of said slides, said check openings being arranged so that they are normally out of alignment but are aligned to receive a sense pin when said slides have properly assumed their active positions in response to the actuation of said slides after the insertion of the stop pin associated with said sense pin;

means operative after the actuating of said slides for releasing the sense pin associated with the inserted stop pin; and error indicating means responsive to the failure of the released sense pin to pass through all the check openings associated therewith for preventing the operation of said output means.

4. A checking mechanism of the type described in claim 3 wherein the error indicating means comprises an additional slide which is movable from an inactive to an active position, said additional slide having a row of openings adapted to receive extended sense pins which pass through all of the check openings associated therewith:

means operative after a sense pin has been released for yieldably urging said additional slide toward its active position whereby said additional slide is caused to move to its active position if the released sense pin fails to penetrate an opening in said additional slide, and said additional slide is retained in its inactive position if a released sense pin penetrates an opening in said additional slide; and means responsive to the movement of said additional slide to its active position for indicating an error.

5. A checking mechanism for use in a character encoding device having:

a set of elongated superposed encoding slides movable longitudinally from inactive to active positions;

a row of normally retracted stop pins positioned at stations along said set of encoding slides;

a corresponding row of code openings in each of said encoding slides, the code openings at each station being arranged so that they are aligned to permit the insertion of the stop pin associated therewith through all of said encoding slides when said encoding slides are in their inactive positions, some of the code openings at each station being elongated so as to permit movement of said encoding slides to their active positions after insertion of said stop pin;

means for selecting the stop pin corresponding to the character to be encoded;

means for inserting the selected stop pin through its associated code openings;

actuating means operative after the insertion of said stop pin for yieldably urging said encoding slides toward their active positions, whereby the encoding slides having elongated code openings associated with the inserted stop pin are caused to move to their active positions while the other encoding slides are retained in their inactive positions by said inserted stop pin; and output means responsive to the positions of said encoding slides for producing output manifestations;

said checking mechanism comprising:

a row of normally retracted sense pins positioned beside said row of stop pins and releasably biased toward said encoding slides, a sense pin being associated with the stop pin at each station;

a corresponding row of check openings in each of said encoding slides, each of said check openings being positioned adjacent the active position of its associated code opening so that the check openings at a station are normally out of alignment but are aligned to receive a sense pin when said encoding slides have properly assumed their active positions after the insertion of the stop pin through the code openings at said station;

means operative after the actuating of said encoding slides for releasing the sense pin associated with the inserted stop pin;

an error detecting slide which is movable from an inactive to an active position;

a row of openings positioned at stations along said error detecting slide so as to receive released sense pins which pass through all of the check openings associated therewith;

means operative after a sense pin has been released for yieldably urging said error detecting slide toward its active position whereby said error detecting slide is caused to move to its active position if the released sense pin fails to penetrate an opening in said error detecting slide, and said error detecting slide is retained in its inactive position by said released sense pin if said extended sense pin penetrates an opening in said error detecting slide; and means responsive to the movement of said error detecting slide to its active position for indicating an error.

6. A checking mechanism for use in a character encoding device of the type described in claim 5, wherein the means for selecting the stop pin corresponding to the character to be encoded comprises:

a set of elongated superposed decoding slides disposed between said encoding slides and said row of normally retracted stop pins;

means for moving said decoding slides in code combinations representative of characters; and a plurality of openings in said decoding slides, the openings at each station being normally out of alignment but adapted to move into alignment to pass a stop pin when said decoding slides are moved in the code combination representative of the character associated with that station.

7. A checking mechanism of the type described in claim 6 wherein the stop pin and the sense pin at each station depend from a single pin arm which is spring biased toward said slides, said stop pin being slightly longer than said sense pin.

8. A checking mechanism of the type described in claim 7 wherein the movement of the pin arms toward and away from the slides is controlled by a two-step cam coacting with cam follower portions of said pin arms, said cam having:

a first surface region of which the radius from the axis of rotation of the cam is sufficiently small to permit both the stop pins and the sense pins to penetrate the slides;

a second surface region of which the radius from the axis of rotation of the cam is sufficiently great to retain both the stop pins and the sense pins free of the slides; and an intermediate surface region of which the radius from the axis of rotation of the cam is sufficiently small to permit the stop pins to penetrate the slides but sufficiently large to retain the sense pins free of the slides.

9. A checking mechanism for use in apparatus for driving a set of superposed slides in coded combinations comprising:

a plurality of sensing means positioned adjacent to said slides, each of said sensing means corresponding to one of the coded combinations in which the slides may be driven;

a plurality of check openings in each of said slides, the check openings associated with each sensing means being arranged so that they are normally out of alignment but are aligned to form a passage through all of said slides when said slides have properly moved in the coded combination corresponding to said sensing means;

means operative after said slides are driven in a coded combination for activating the sensing means corresponding to said coded combination; and error indicating means responsive to said sensing means for indicating an error if the activated sensing means fail to sense a passage through all of said slides.

10. A checking mechanism for use in apparatus for driving a set of superposed slides in coded combinations comprising:

an array of normally retracted sense pins releasably biased toward said slides, each of said sense pins corresponding to one of the coded combinations in which the slides may be driven;

a corresponding array of check openings in each of said slides, said check openings being arranged so that they are normally out of alignment but are aligned to receive a sense pin when said slides have properly moved in the coded combinations corresponding to said sense pin;

means operative after the driving of said slides for releasing the sense pin; and error indicating means responsive to the failure of the released sense pin to pass through all the check openings associated therewith for indicating an error.

No references cited.

DARYL W. COOK, *Primary Examiner.*